United States Patent
Choudhury et al.

(10) Patent No.: US 8,699,376 B2
(45) Date of Patent: Apr. 15, 2014

(54) METHOD AND SYSTEM FOR DE-SYNCHRONIZING LINK STATE MESSAGE REFRESHES

(75) Inventors: Gagan Choudhury, Marlboro, NJ (US); Mark Evans, Hillsborough, NJ (US); Shih-Yue Hou, Tinton Falls, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 1009 days.

(21) Appl. No.: 11/962,503

(22) Filed: Dec. 21, 2007

(65) Prior Publication Data

US 2009/0161577 A1 Jun. 25, 2009

(51) Int. Cl.
*H04L 12/28* (2006.01)

(52) U.S. Cl.
USPC .......................... 370/254; 370/252

(58) Field of Classification Search
USPC ......... 370/236, 466, 221, 252, 316, 237, 216, 370/238, 392, 400, 352, 254, 410, 465, 229, 370/412; 709/238
See application file for complete search history.

(56) References Cited

U.S. PATENT DOCUMENTS

| | | | |
|---|---|---|---|
| 6,349,091 B1 | 2/2002 | Li | |
| 6,757,258 B1 * | 6/2004 | Pillay-Esnault | 370/254 |
| 6,775,709 B1 | 8/2004 | Elliott | |
| 6,885,634 B1 | 4/2005 | Choudhury et al. | |
| 6,898,187 B2 * | 5/2005 | Perlman et al. | 370/252 |
| 7,006,441 B1 | 2/2006 | Choudhury et al. | |
| 7,126,921 B2 | 10/2006 | Mark et al. | |
| 7,203,162 B2 | 4/2007 | Bitar | |
| 2004/0047288 A1 * | 3/2004 | Basso et al. | 370/229 |
| 2005/0078656 A1 * | 4/2005 | Bryant et al. | 370/351 |
| 2006/0045024 A1 * | 3/2006 | Previdi et al. | 370/254 |
| 2006/0133298 A1 * | 6/2006 | Ng et al. | 370/254 |
| 2007/0214496 A1 * | 9/2007 | Perkins et al. | 726/3 |

OTHER PUBLICATIONS

J. Moy, "OSPF Version 2", Apr. 1998, IETF RFC 2328.
R. Coltun, et al., "OSPF for IPV6", Dec. 1999, IETF RFC 2740.
D. Katz, et al., "Traffic Engineering Extensions to OSPF Version 2", Sep. 2003, IETF RFC 3630.
P. Pillay-Esnault, "OSPF Refresh and Flooding Reduction in Stable Topologies", Jul. 2005, IETF RFC 4136.
G. Choudhury, "Prioritized Treatment of Specific OSPF Version 2 Packets and Congestion Avoidance", Oct. 2005, IETF RFC 4222.

\* cited by examiner

*Primary Examiner* — Hassan Phillips
*Assistant Examiner* — Siren Wei
(74) *Attorney, Agent, or Firm* — Fay Kaplun & Marcin, LLP

(57) ABSTRACT

A node having a memory storing a network topology and a routing table. The node also having a processing device programmed to generate a link state message and during the generating of the link state message, set a value of an age field of the link state message to a random value.

21 Claims, 4 Drawing Sheets

METHOD AND SYSTEM FOR DE-SYNCHRONIZING LINK STATE MESSAGE REFRESHES

BACKGROUND INFORMATION

Networks require a protocol for routing data from an originating node to a destination node, since in order to reach its destination the data must traverse an oftentimes vast, intricately interconnected group of intermediate nodes. A link-state protocol is one type of routing protocol for calculating a shortest available route between an originating node and a destination node. Typically used in a packet-switched network, a link-state protocol gives to each node the ability to calculate the best route to a destination for a packet it has received. In order for every node to do such routing, each node must create a routing table showing the shortest (or least costly) path from itself to every other possible destination in the network. In significantly large networks, the scope of the routing table for a node may cover the connectivity of only a sub-area of nodes in the network. In order to determine a routing table, the node must receive information indicating the overall network topology, that is, information indicating how every node is linked in the network.

One type of link-state protocols is Open Shortest Path First (OSPF). The OSPF standard is described in Moy, J., "OSPF Version 2," IETF RFC 2328, April, 1998, which is hereby incorporated by reference. Other documents describing the OSPF standard include Coltun R., D. Ferguson, J. Moy, "OSPF for IPV6," IETF RFC 2740, December, 1999; and Katz D., K. Kompella, D. Yeung, "Traffic engineering Extensions to OSPF Version 2," IETF RFC 3630, September 2003, both of which as well are hereby incorporated by reference. As explained above, every node in an OSPF network determines a routing table, but before it can do so it must receive from every other node in the network a link state advertisement (LSA). In the OSPF protocol, an LSA is a type of link state message that contains all the link information for the node that generated the LSA. The LSA of every node is flooded throughout the entire network to ensure that every node has sufficient information to generate its own routing table.

In the header of every type of LSA message is an LS age field. Currently in all versions of the OSPF protocol the LS age field of every type of LSA is set to 0 by the originating node (typically embodied as a router). The LS age (in seconds) is increased, usually by one per hop, as it is flooded and also aged according to standard clock time while it is stored in the database. LSAs are refreshed by the originating node as soon as it reaches the value LSRefreshTime (default 1800 seconds). It is possible for the refresh instants of a vast number of LSAs to be synchronized, thereby causing an LSA storm. During an LSA storm, some nodes, particularly ones with less powerful processors, cannot keep up with the workload. This may result in many retransmissions, loss of adjacency, and eventually loss of customer traffic.

SUMMARY OF THE INVENTION

A node having a memory storing a network topology and a routing table. The node also having a processing device programmed to generate a link state message and during the generating of the link state message, set a value of an age field of the link state message to a random value.

A method operating in a first node of a network, the network comprising a plurality of nodes, the method generating a link state message, wherein the generating includes setting a value of an age field of the link state message to a random value.

A system having a means for determining a random value in a first node of a network including a plurality of nodes and a means for generating, in the first node, a link state message, wherein the means for generating includes means for setting a value of an age field of the link state message to the random value.

DETAILED DESCRIPTION

Although the present invention is discussed within the context of a network using the OSPF protocol, the present invention is applicable to any link-state protocol, particularly those that flood the network with link-state messages in such a way as to make the network vulnerable to broadcast storms, such as, for instance, the PNNI (Private Network-Network Interface) or IS-IS (Intermediate System-Intermediate System) protocols.

Figure 1:
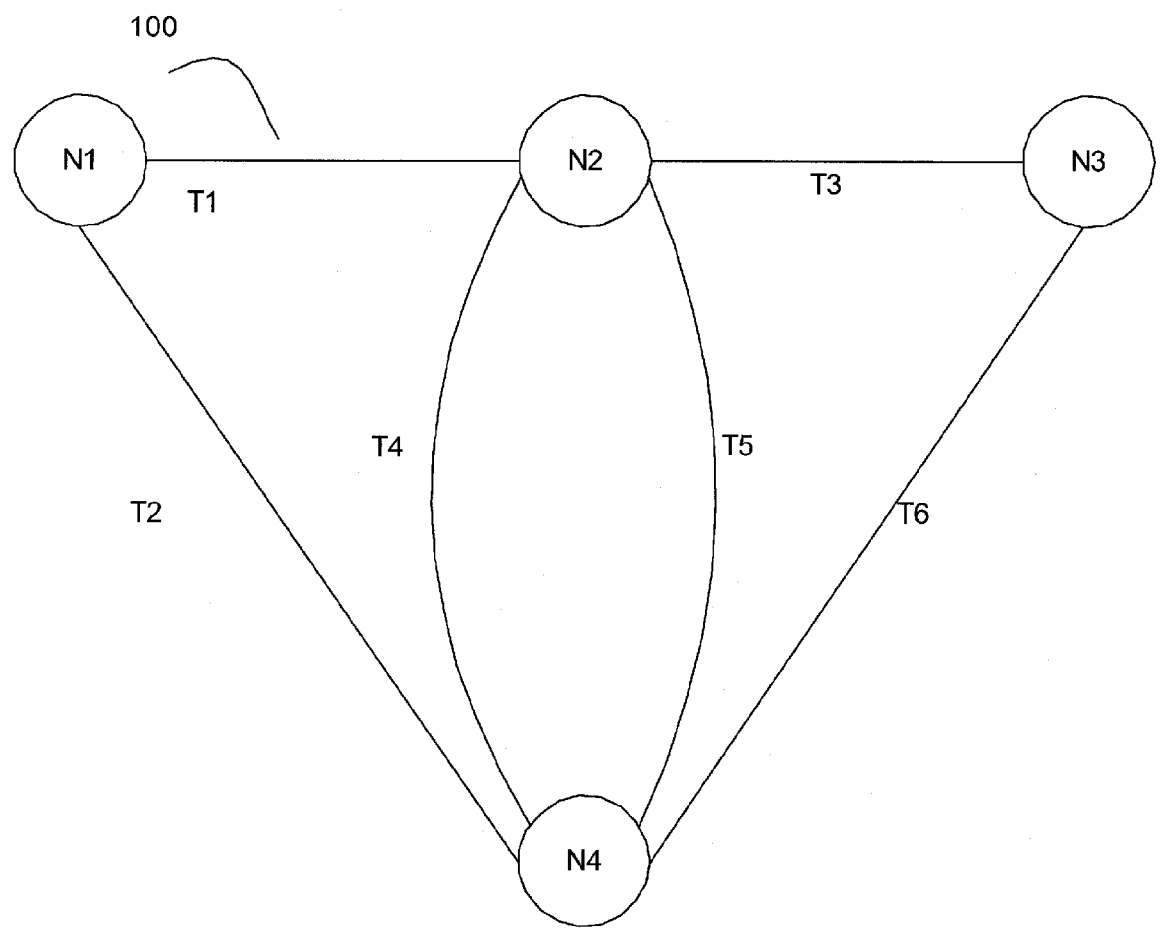
FIG. 1 is a schematic representation of an exemplary network configuration having link-state message processing in accordance with the present invention.

FIG. 1 shows an exemplary communication network 100 that processes OSPF link-state protocol control messages, particularly, link state advertisement (LSA) messages. The network 100 includes four nodes N1, N2, N3, N4 that are interconnected by six trunks T1, T2, T3, T4, T5, T6. The first trunk T6, connects the first and second nodes N1, N2 and the second trunk T2 connects the first and fourth nodes N1, N4. The second and fourth nodes N2, N4 are interconnected by the fourth and fifth trunks T4, T5. The sixth trunk T6 connects the third and fourth nodes N3, N4. IP traffic flow is uni-directional and goes over a sequence of uni-directional links. So each trunk in FIG. 1 may be considered to be consisting of a set of two uni-directional links, one in each direction. It is further understood that the nodes N may be embodied as a variety of devices including IP routers, ATM switches, GMPLS (Generalized Multiprotocol Label Switching)—enabled Optical switches, and VPLS capable Ethernet switches such as the Cisco 7600 or Juniper MX960, all of which use a link-state-based routing protocol. Those skilled in the art will understand that the network 100 is only exemplary and that an actual network may have hundreds or thousand of nodes.

Figure 2:
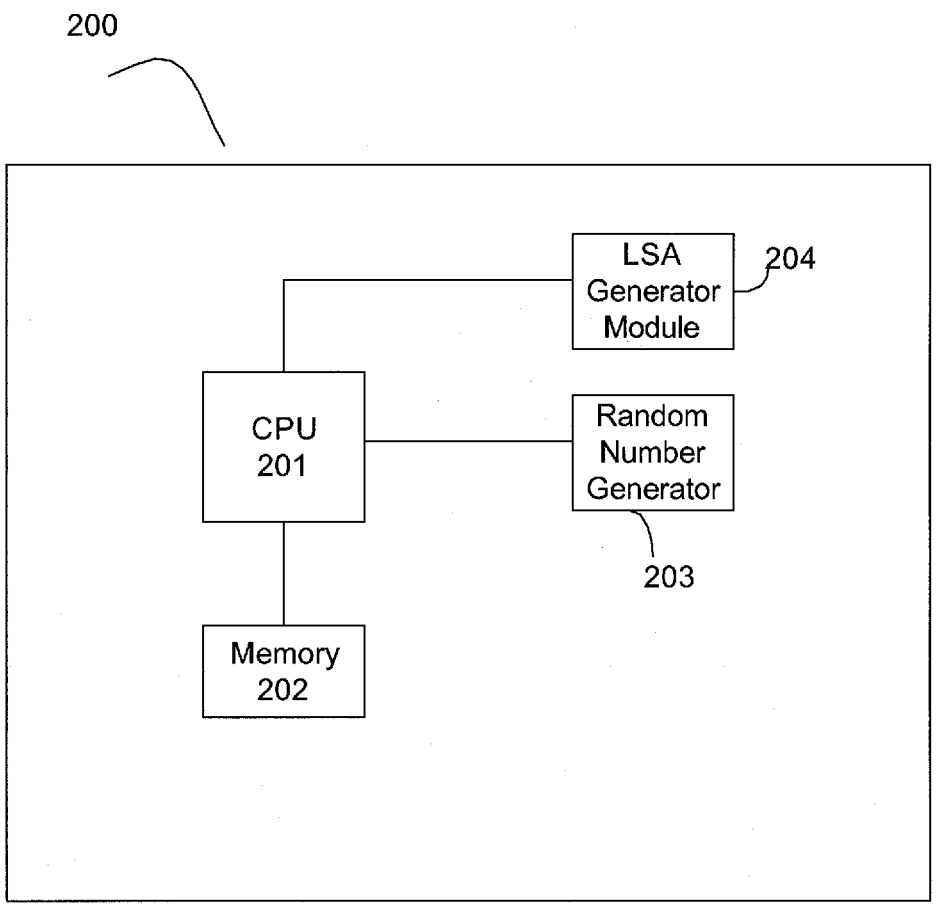
FIG. 2 shows an exemplary method for setting the LSA age field to an initial random value in order to prevent LSA storms caused by the synchronized refreshing of multiple LSAs from a corresponding multiplicity of nodes.

FIG. 2 shows a schematic diagram of a node 200 for use in the network of FIG. 1. Node 200 includes a CPU 201 or other suitable processing device programmed to process OSPF messages, memory 202 for storing the network topology and the routing table, random number generator 203 for use in generating the LSA age field, and LSA generating module 204. As a node that is used in an OSPF network, node 200 is equipped to generate all the necessary OSPF control messages. Those skilled in the art will understand that the LSA generating module 204 and random number generator 203 being shown as separate components is only exemplary. Each of these components may be, for example, software code stored in the memory 202 and executed by the CPU 201 to perform the functionality described herein.

Figure 3:
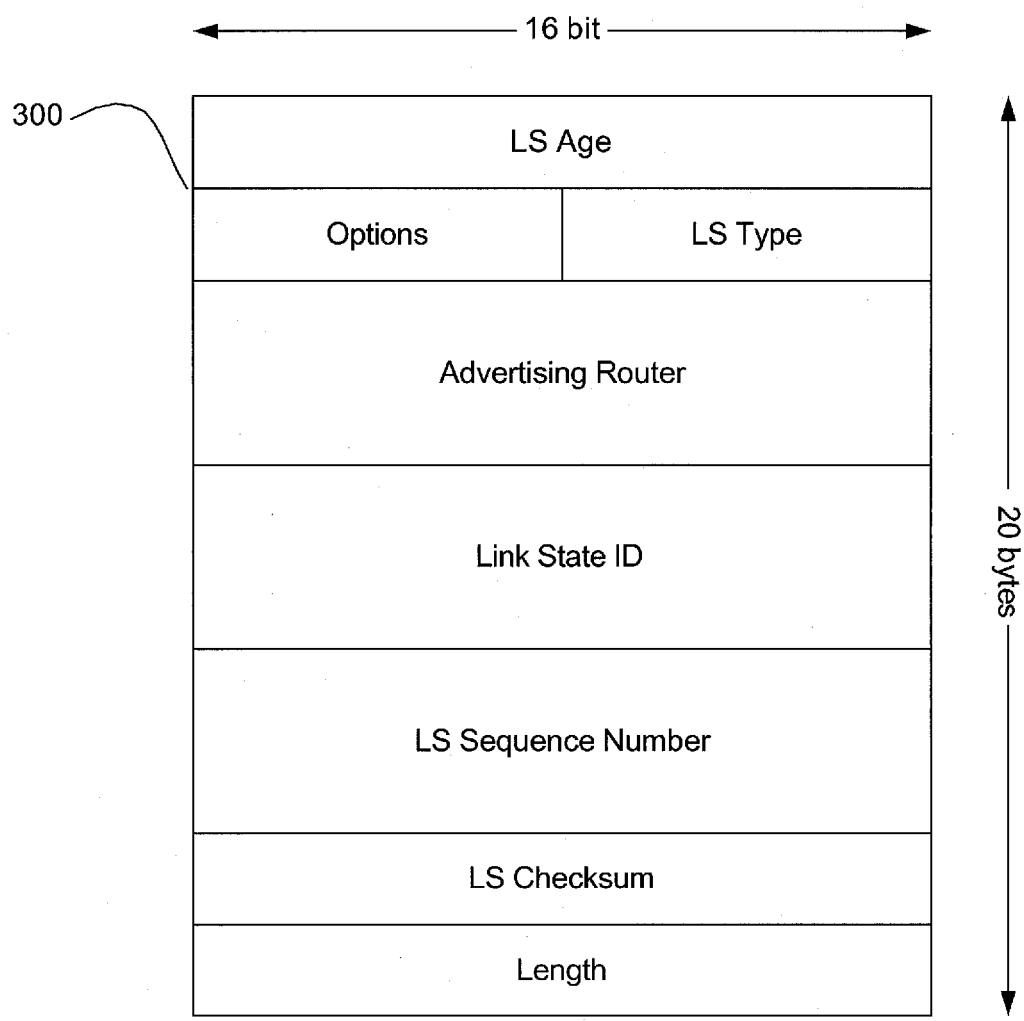
FIG. 3 shows an exemplary illustration of an LSA message.

FIG. 3 is a diagram showing an example of an LSA message 300 that LSA generating module 204 produces. The LSA message 300 includes an LS age field, an Options field, an LS type field, a Link State ID field, an Advertising Router field (which may also be called an Advertising Node field), an LS Sequence Number field, an LS checksum field, and a Length field. These fields are described in more detail in J. Moy, "OSPF Version 2," RFC2328, ftp://ftp.normos.org/ietf/rfc/rfc2328.txt, April 1998. The OSPF Version 2 and OSPF for IPV6 (also known as OSPFV3) routing protocols use LSAs that contain topology and other information needed for routing and are flooded throughout an area of an Autonomous System (AS) (e.g., the network of FIG. 1) or throughout the entire AS. The five primary types of LSAs in OSPF Version 2 are Router LSA (Type 1), Network LSA (Type 2), Network Summary LSA (Type 3), Autonomous System Boundary Router (ASBR)—Summary LSA (Type 4) and AS External LSA (Type 5), but there may be other types as well, for example, Traffic engineering LSAs. The exemplary embodiments of the present invention are applicable to all these LSA types.

The exemplary embodiments are directed to the setting of a value for the LSA age field, which roughly represents the number of seconds that have elapsed since the creation of the LSA to which the LSA field belongs. In prior OSPF systems, the originating node sets the initial value of the LS age field to 0. During the flooding process each router on the path of flooding adds a value ("sometime referred to as InfTranspelay") which is (the time to transit over the interface in seconds with minimum value of 1 to the LS age field. In addition, every node holding an LSA in its database increases the LS age parameter to reflect the amount of time (in seconds) the LSA has stayed in the database. LSAs are re-originated (i.e., refreshed) and flooded by the originating router whenever there is a change in its content (e.g., one of the interfaces advertised by a Router LSA goes down). In addition, if an LSRefreshTime timer expires (e.g., a default value of 1800 seconds) without any changes in content, the LSA is refreshed (and flooded) with the old content. If an LSA reaches a value MaxAge (e.g. a default value of 3600 seconds) then it is flooded again with LS age set to MaxAge and all routers receiving such an LSA flush it from their databases.

LSA generation and flooding usually does not consume significant node resources as long as the network stays small in size. However, as the network grows in size (to hundreds or thousands) in terms of the number of nodes, the number of links and the number of routes that need to be advertised, some of the nodes (particularly the less powerful ones in the network) may be overwhelmed by the requirement of LSA processing. Specifically, during an LSA refresh, this happens particularly if many LSAs arrive in a synchronized or near-synchronized fashion, sometimes referred to as an "LSA storm." If too many LSAs come in too quickly at a "not too powerful" node, it may not be able to process some critical messages. As one example, if the node does not acknowledge an LSA from a neighbor within a predetermined time interval (sometimes referred to as the "RxmtInterval" which has a default of 5 seconds) the neighbor will retransmit the LSA, in effect adding to the already existing LSA storm. As another example, if the node misses sending/receiving Hello packets to/from a neighbor for a predetermined period (sometimes referred to as the "RouterDeadInterval" (having a default value around 30 to 40 seconds), the interface will be declared down.

Figure 4:
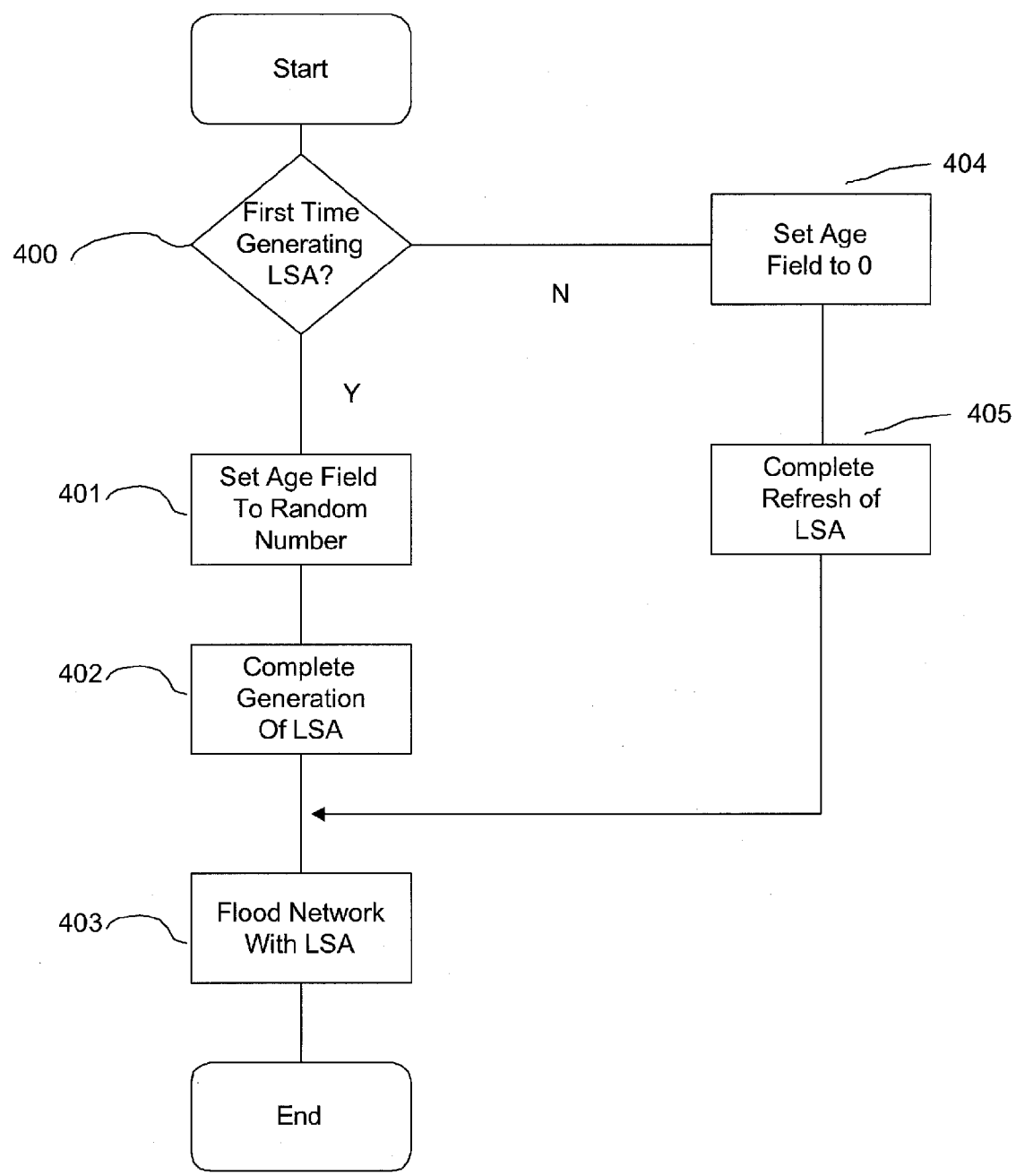
FIG. 4 shows a flow diagram illustrating an operation of an exemplary embodiment of the present invention.

In order to eliminate LSA storms due to synchronized refresh behavior, the exemplary embodiment of the present invention propose de-synchronizing refresh instances of all LSAs. FIG. 4 shows a flow diagram of a method to be used in every node in the network for ensuring that LSA refresh operations are desynchronized from each other. Step 400 involves the node initiating the LSA generating module 204 by determining if the LSA to be generated is being generated for the first time, or whether it is an old LSA that is being refreshed. If the LSA to be generated is new, then in step 401, rather than follow the normal process and set the value of the age field to zero, the node uses its random number generator to set the value in the LSA age field to a random value. This de-synchronizes all future LSA refresh instances without having to do anything special during the refreshes. The node then completes the generation of the LSA (step 402) and floods the network with the generated LSA (step 403). As a result of this random value for the initial generation of an LSA, the exemplary embodiment of the present invention allow a packet-switched network using OSPF routing to scale to a large size by avoiding potential instability caused by storms due to synchronous refresh of LSAs. If, on the other hand, the LSA in question is an old one to be refreshed, then its age field is set to 0 according to the typical procedure for generating LSAs (step 404), and after the rest of its contents have been refreshed (step 405), it is flooded to the rest of the network (step 403).

The above-described setting of the age field to a random number applies whenever a node generates an LSA for the first time. The random age for the LSA field can range between 0 and a value termed "MaxRandomAge." The value of MaxRandomAge should be large compared to 1 but small compared to the LSRefreshInterval. As an example, if LSRefreshInterval is 1800 seconds (default value) then MaxRandomAge may be set to 600. For all subsequent refreshes of the same LSA no changes from current practice is needed, i.e., the LS age value may be set to 0 as usual. The random aging at the first origination instant of the LSAs will ensure that they will stay de-synchronized during all subsequent refreshes.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method to be performed in a first node of a network, the first node having a plurality of interfaces, the method comprising:

generating a first link state message to a first age field for a first interface of the plurality of interfaces, the first age field being a first random link state advertisement age value; and generating a second link state message to a second age field for a second interface of a plurality of interfaces, the second age field being a second random link state advertisement age value, wherein the first random link state advertisement age value is different from the second random link state advertisement age value, and wherein the first age field and the second age field are randomized only for a first generation of the first and second link state messages, and are not randomized for at least one subsequent generation of the first and second link state messages.

2. The method of claim 1, further comprising:
flooding the network with the link state messages.

3. The method of claim 1, wherein the first random link state advertisement age value is between 0 and a predetermined maximum value.

4. The method of claim 3, wherein the predetermined maximum value is less than a refresh interval for link state messages.

5. The method of claim 4, wherein the predetermined maximum value is 600 seconds, and the refresh interval is 1800 seconds.

6. The method of claim 1, further comprising:
refreshing the link state messages, wherein a value for the age field of the refreshing link state messages is set to 0.

7. The method of claim 1, wherein each of the link state messages is a link state advertisement used in an Open Shortest Path First protocol.

8. The method of claim 7, wherein a type of the link state advertisement includes one of Router link state advertisement, Network link state advertisement, Network Summary link state advertisement, Autonomous System Boundary Router—Summary link state advertisement, Autonomous System External link state advertisement, and Traffic engineering link state advertisement.

9. The method of claim 1, wherein the network of nodes operates in accordance with one of an Open Shortest Path First protocol, a Private Network-to-Network Interface protocol, and an Intermediate System to Intermediate System protocol.

10. A system, comprising:
a first network node comprising:
a memory storing a set of instructions; and
a processor executing the set of instructions to perform operations comprising:
generating a first link state message, the first link state message including a first age field, the first age field being a first random link state advertisement age value; and
a second network node comprising:
a memory storing a set of instructions; and
a processor executing the set of instructions to perform operations comprising:
generating a second link state message, the second link state message including a second age field, the second age field being a second random link state advertisement age value;
wherein the first random link state advertisement age value is different from the second random link state advertisement age value, and
wherein the first age field and the second age field are randomized only for a first generation of the first and second link state messages, and are not randomized for at least one subsequent generation of the first and second link state messages.

11. The system of claim 10, wherein the first network node and the second network node flood the network with the link state messages.

12. The system of claim 10, wherein the first random link state advertisement age value is between 0 and a predetermined maximum value.

13. The system of claim 12, wherein the predetermined maximum value is less than a refresh interval for link state messages.

14. The system of claim 13, wherein the predetermined maximum value is 600 seconds, and the refresh interval is 1800 seconds.

15. The system of claim 10, wherein the first network node and the second network node perform a refresh of the link state messages, wherein a value for the age field of the refreshed link state message is set to 0.

16. The system of claim 10, wherein each of the link state messages is a link state advertisement used in an Open Shortest Path First protocol.

17. The system of claim 16, wherein a type of the link state advertisement includes one of Router link state advertisement, Network link state advertisement, Network Summary link state advertisement, Autonomous System Boundary Router (ASBR) Summary link state advertisement, AS Autonomous System External link state advertisement, and Traffic engineering link state advertisement.

18. The system of claim 10, wherein the network of nodes operates in accordance with one of an Open Shortest Path First protocol, a Private Network-to-Network Interface protocol, and an Intermediate System to Intermediate System protocol.

19. A node, comprising:
a plurality of network interfaces;
a memory storing a network topology, a routing table, and a set of instructions; and
a processing device executing the set of instructions to perform operations comprising:
generating a first link state message to a first age field for a first interface of the plurality of interfaces, the first age field having a first random link state advertisement age value; and
generating a second link state message to a second age field for a second interface of the plurality of interfaces, the second age field having a second random link state advertisement age value,
wherein the first random link state advertisement age value is different from the second random link state advertisement age value; and
wherein the first age field and the second age field are randomized only for a first generation of the first and second link state messages, and are not randomized for at least one subsequent generation of the first and second link state messages.

20. The node of claim 19, wherein the node operates in accordance with one of an Open Shortest Path First protocol, a Private Network-to-Network Interface protocol, and an Intermediate System to Intermediate System protocol.

21. The node of claim 19, wherein each of the link state messages is a link state advertisement used in an Open Shortest Path First protocol.

\* \* \* \* \*